UNITED STATES PATENT OFFICE.

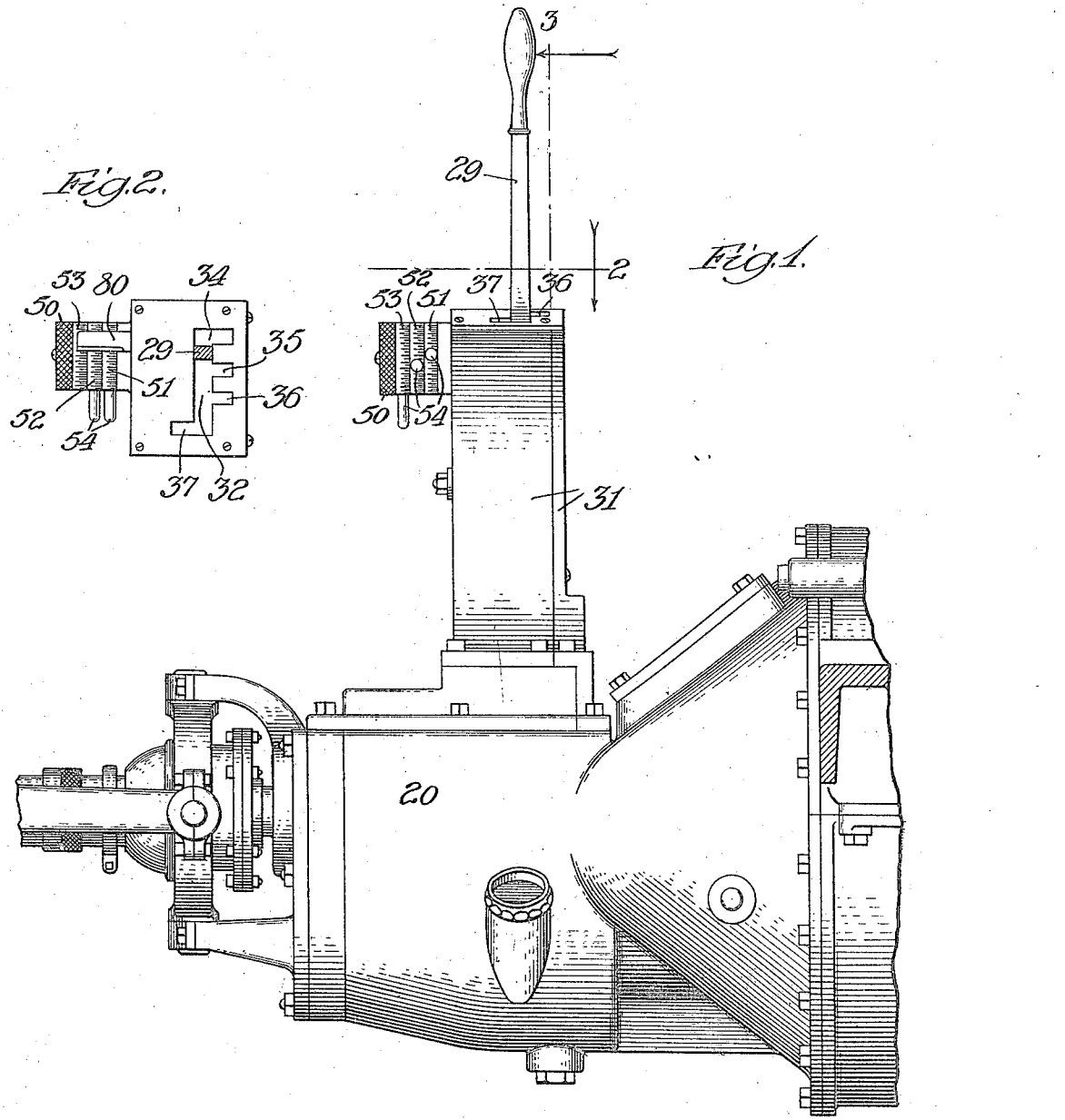

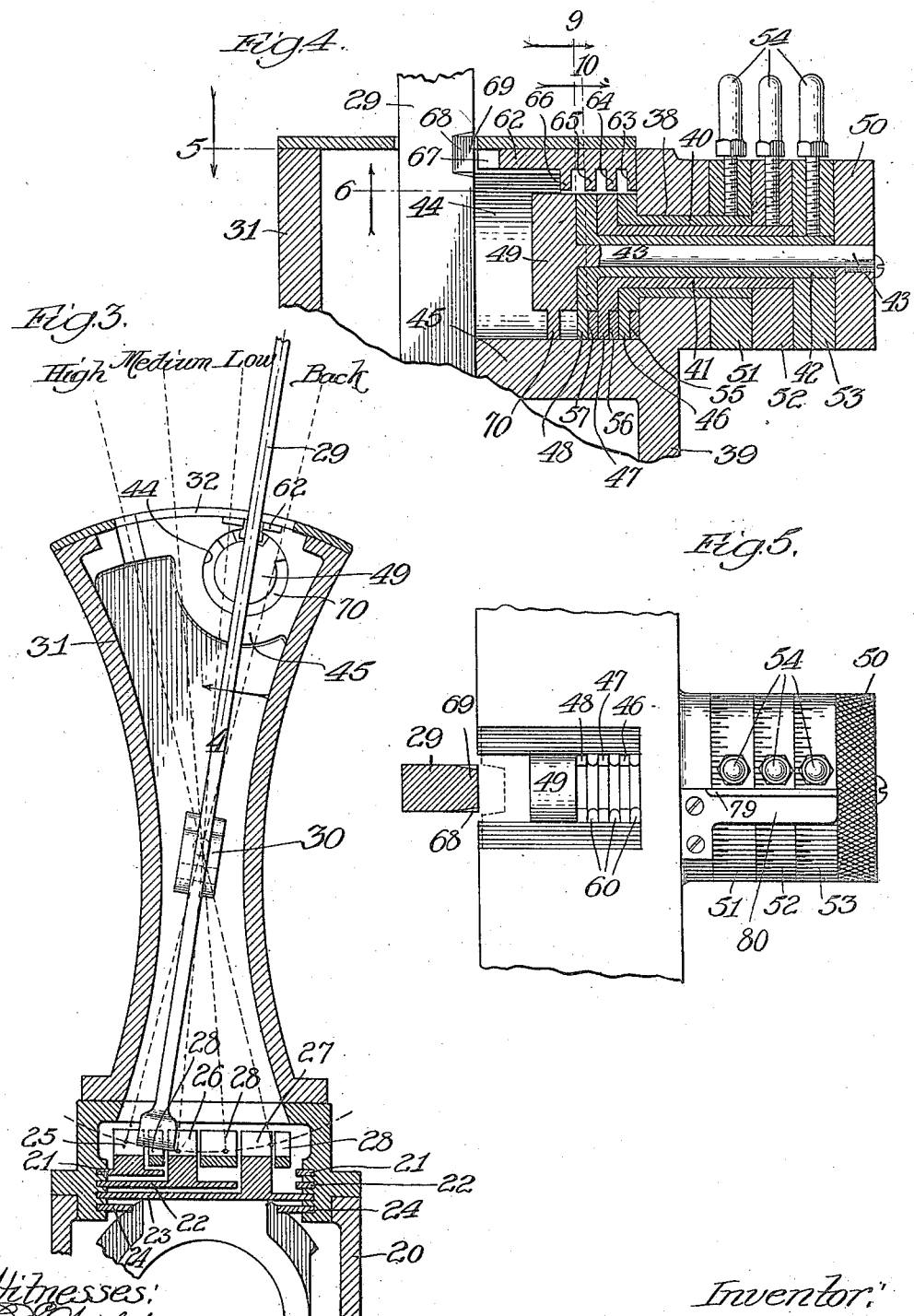

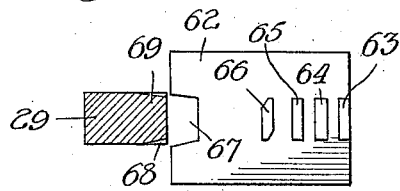
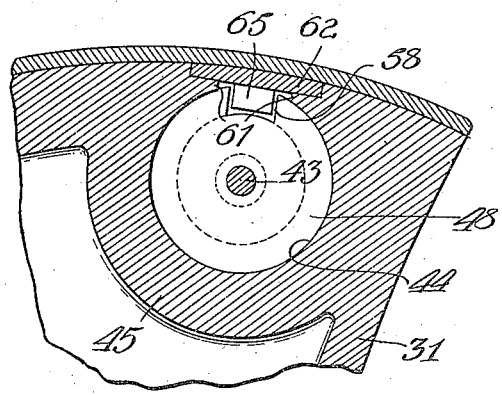
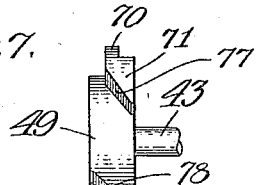
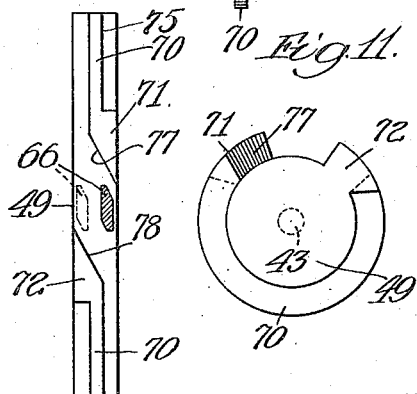
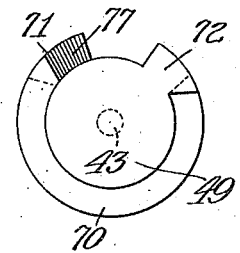
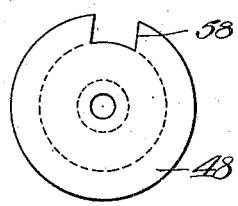
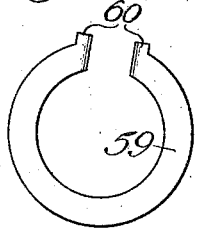
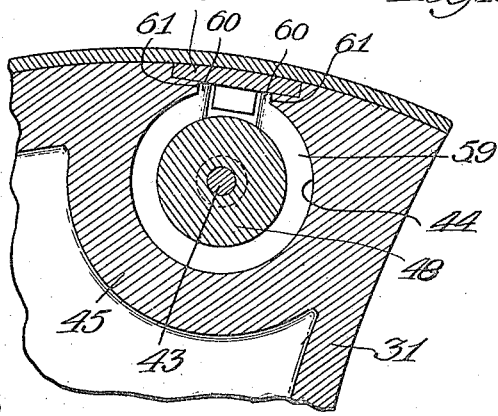
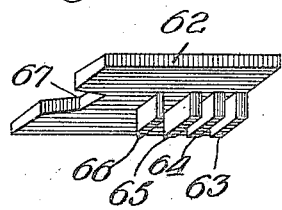

FREDERICK P. ROSBACK, OF BENTON HARBOR, MICHIGAN.

PERMUTATION-LOCK.

1,239,222.  Specification of Letters Patent.  Patented Sept. 4, 1917.

Application filed April 9, 1917. Serial No. 160,790.

*To all whom it may concern:*

Be it known that I, FREDERICK P. ROSBACK, a citizen of the United States, residing at Benton Harbor, in the county of Berrien and State of Michigan, have invented a new and useful Improvement in Permutation-Locks, of which the following is a specification.

My invention relates to improvements in permutation locks for locking the control lever of transmission mechanism in such position as for example neutral position, that it will be impossible to start the car to which the locking mechanism is applied.

My primary object, generally stated, is to provide a novel and simple form of mechanism for the purpose above stated, which shall operate to positively and effectively lock the control lever against actuation, which may be readily actuated to unlocked condition by an authorized person, and which will avoid the necessity of the use of a key, or other separate actuating element, the lock being in effect, self-contained.

Referring to the accompanying drawings:

Figure 1 is a view in elevation of the gear-transmission-casing, with the control lever therefor and certain other parts, of an automobile construction, equipped with my improved permutation lock.

Fig. 2 is a plan view of the portion of the said casing through which the control lever extends, the latter being shown in section.

Fig. 3 is an enlarged broken section taken at the line 3 on Fig. 1 and viewed in the direction of the arrow.

Fig. 4 is an enlarged broken section taken at the line 4 on Fig. 3 and viewed in the direction of the arrow.

Fig. 5 is a plan view of the structure shown in Fig. 4, a portion being sectioned with the section taken at the line 5 on Fig. 4 and viewed in the direction of the arrow.

Fig. 6 is a bottom plan view of one of the elements of my improved locking mechanism, this view also showing the control lever to be locked thereby, the lever being shown in section, with the section taken at the line 6 on Fig. 4 and viewed in the direction of the arrow.

Fig. 7 is a view in side elevation of a rotatable cam-member coöperating with the locking element of Fig. 6 for controlling the position of the latter relative to the control lever.

Fig. 8 is a developed view of the periphery of the member shown in Fig. 7.

Fig. 9 is a section taken at the line 9 on Fig. 4 and viewed in the direction of the arrow.

Fig. 10 is a section taken at the line 10 on Fig. 4 and viewed in the direction of the arrow.

Fig. 11 is a view in end elevation of the member shown in Fig. 7, as viewed from the left hand side of this figure.

Fig. 12 is a face view of the disk shown in Fig. 9.

Fig. 13 is a face view of one of a plurality of similar segmental rings forming a part of the mechanism shown in Fig. 4; and Fig. 14, a perspective view of the locking element of Fig. 6, this view being taken in a plane below that in which the locking element extends.

I have chosen to illustrate my invention in connection with the control-lever of a particular construction of gear-transmission, which however forms no part of the invention forming the subject of this application, but is presented in my co-pending application, Serial No. 160,789, filed April 9, 1917. It is sufficient to state that the case represented at 20 is the case in which the gear-transmission is housed, the various interengaging parts thereof being operated through the medium of the sliding plates 21, 22, 23 and 24 having grooves 25, 26, 27 and 28 across their upper surfaces which, when the parts of the transmission are in neutral condition, extend in alinement, there being provided for coöperation with these plates, a control-lever 29 having universal joint connection at 30 with an upright extension 31 of the case 20 and through the upper and lower ends of which the lever 29 projects, the lower end of this lever being adapted to move through the alining recesses in the plates and be swung on its pivot 30 to shift these plates, or a combination thereof, lengthwise to effect the desired operative relation between the operating parts of the gear-transmission. The upper end of the lever 29 projects through a slot 32 in the top plate of the extension 31, this slot having branch slots 34, 35, 36 and 37, the slots 34, 35 and 36 being at one side of the straight slot 32 and the slot 37 at the opposite side of the slot 32 and at one end thereof. These various slots are so arranged that when the lever 29 extends into the straight slot 32 it is in neutral position and the slides above referred to are likewise in this position, and the parts of the transmission will be in position for reverse driving, low speed forward, medium speed forward or high speed forward, depending upon the lever 29 being in the slots 34, 35, 36 and 37, respectively.

The locking means, preferably for holding the lever 29 in neutral position, comprises, in accordance with the preferred embodiment of my invention, the following mechanism.

Journaled in an opening 38 in a wall 39 of the cover extension 30, are telescoped sleeves 40, 41 and 42, the sleeve 42 containing a rotatable shaft 43. The inner ends of these sleeves project beyond each other in succession as illustrated and are located in a cylindrical chamber 44 provided in the thickened portion 45 of the wall 39, with circular disks 46, 47 and 48 respectively, preferably of the same diameter, the shaft 43 carrying a disk 49 adjacent the disk 48, and having a knurled finger piece 50 secured thereto at its outer end by which to rotate the shaft 43 and disk 49. The sleeves 40, 41 and 42, which extend beyond each other in succession at their outer ends, carry disks 51, 52 and 53 secured thereto as by the set screw devices 54 the last-referred-to disks and the knurled member 50 being preferably of the same diameter. The disks 46, 47 and 48 contain in their peripheries annular recesses 55, 56 and 57 which open through corresponding faces of the disks as shown, a portion of the periphery of each of these disks being slotted as represented at 58, the slots in these various disks alining when the sleeves 40, 41 and 42 are in certain positions. The recesses 55, 56 and 57 preferably contain friction rings 59 of segmental form as shown in Fig. 13 which are held against displacement by engagement of shoulders 60 thereon, with shoulders 61 provided on the inner wall of the chamber 44 in which the disks 46, 47, 48 and 49 are rotatably confined. Coöperating with the disks 55, 56 and 57, is a sliding bolt 62 equipped with depending lugs 63, 64, 65 and 66. The lugs 63, 64, and 65 which are no thicker than the rings 59, extending into the recesses in the peripheries of these respective rings when the bolt 62, is in one position, namely that shown in Fig. 4, wherein this bolt is out of locking position, this bolt containing in its left hand edge, in Fig. 4, a recess 67, the walls of which embrace the inclined sides 68 of the reduced portion 69 of the lever 29 (Fig. 6), when the bolt 62 is shifted to the left in Fig. 4 to the locking position hereinafter referred to. The periphery of the disk 49 is provided with a flange 70, which extends parallel with the faces of this disk and preferably equidistant therefrom, this flange terminating at its opposite ends in the portions 71 and 72 of the disk 49, as represented in Fig. 8, and the end walls of these portions are inclined as represented at 77 and 78 respectively, these inclined surfaces being parallel with each other and spaced apart as shown, to form cams. The parts just described coöperate with the lug 66 on the plate or locking bolt 62 in the following manner. In the position of the bolt 62 in Fig. 4, the lug 66 extends adjacent the surface 75 of the flange 70, and assuming the slots 58 of the disks 46, 47 and 48 to be in alinement with the depending lugs on the bolt 62, rotation of the shaft 43, through the medium of the knurled member 50, in a clock-wise direction in Fig. 9 will cause the cam surface 77 of the disk 49 to engage an end of the lug 66 and force the bolt 62 to the left in Fig. 4, to a position in which it embraces the control-lever 29, as hereinbefore stated. In this position of the bolt 62, its lugs 63 and 64 extend into the peripheral recesses in those of the friction rings 59 which are located in the recesses 56 and 57, or in other words the bolt is shifted in this operation from the position shown in Fig. 4, to the left in this figure, a distance substantially equal to the thickness of one of the disks 46, 47 or 48. The operator, to lock the bolt 62 against retraction, gives the disks 51, 52 and 53, or any one or more of them, a turn to move the recess, or recesses, 58, as the case may be, out of alinement with the depending lugs on the bolt.

To retract the bolt it is necessary that all of the disks 46, 47 and 48 be moved to the position shown in Fig. 4 in which their recesses 58 aline with the lugs on the locking bolt, and when the disks are so positioned, the operator, by turning the shaft 43 in anti-clockwise direction in Fig. 10, causes the cam 78 to engage the lug 66 and thereby force the bolt 62 to the right in Fig. 4 to the position therein illustrated.

It will be understood from the foregoing that the locking means provided are of the permutation type which dispenses with the use of separate keys, the peripheries of the disks 51, 52 and 53 being provided with markings which coöperate with the edge 79 of a relatively stationary bar 80 secured to the wall 39, these markings being preferably in the form of scales the graduations of which would be preferably numbered as in the case of an ordinary permutation lock, and serving as a guide to the rotation of these disks to proper position for unlocking the mechanism. The locking bolt 62 would therefore be retractable upon rotating the disks 51, 52 and 53 to certain predetermined positions corresponding with the registration of the edge 79 with certain of the graduations on the peripheries of these disks, and thus the operator knowing the combination may readily rotate these disks to a position permitting the bolt 62 to be retracted by rotating the shaft 43.

The friction rings 59 serve primarily to prevent the rotation of any one of the sleeves 40, 41 or 42, or the shaft 43, from rotating any of the others of these parts, and operates to prevent the making of any sounds by the movement of the operative parts, which would indicate to any one the position to which the permutation device of the mechanism should be moved to permit of the retraction of the locking bolt.

While I have illustrated and described a particular form of embodiment of my invention, I do not wish to be understood as intending to limit it thereto as the same may be variously modified and altered without departing from the spirit of my invention, it being my intention to claim my invention as fully and completely as the prior state of the art will permit.

What I claim as new and desire to secure by Letters Patent is:

1. Locking mechanism comprising a shiftable member provided with a plurality of lugs, a plurality of independently rotatable telescoped sleeves, disks on said sleeves containing recesses and adapted when said recesses register with said lugs, to permit said shiftable member to be shifted, and when out of registration therewith to prevent movement of said member, means on said sleeves for independently rotating the latter, and a rotatable member telescoped with said sleeves and carrying means for shifting said shiftable member.

2. Locking mechanism comprising a shiftable member provided with a plurality of lugs and a shoulder-surface, a plurality of independently rotatable telescoped members having recesses and adapted when said recesses register with said lugs, to permit said shiftable member to be shifted, and when out of registration therewith to prevent movement of said member, and a rotatable member telescoped with said sleeves and having a surface adapted to engage the said shoulder-surface on said shiftable member, one of said surfaces being of cam form and coöperating with the other of said surfaces and operating to shift said shiftable member upon rotating said last-named member.

3. Locking mechanism comprising a shiftable member provided with a plurality of lugs and a shoulder-surface, a plurality of independently rotatable telescoped members having recesses and adapted when said recesses register with said lugs, to permit said shiftable member to be shifted, and when out of registration therewith to prevent movement of said member, and a rotatable member telescoped with said sleeves and having cam-surfaces thereon spaced apart and coöperating with said shoulder-surface and operating when said rotatable member is rotated in one direction to shift said shiftable member in one direction, and when rotated in the opposite direction to shift said shiftable member in the opposite direction.

4. Locking mechanism comprising a shiftable member provided with a plurality of lugs and a shoulder-surface, a plurality of independently rotatable telescoped members having recesses and adapted when said recesses register with said lugs, to permit said shiftable member to be shifted, and when out of registration therewith to prevent movement of said member, and a rotatable member telescoped with said sleeves and having a disk-portion at one end equipped at its periphery with a segmental flange spaced from the ends of said disk and terminating at its ends in cam-surfaces extending generally in parallel relation with each other, one of said surfaces operating, when said rotatable member is turned in one direction, to force said shiftable member in one direction by engaging with its said shoulder-surface and the other of said cam-surfaces operating in the reverse rotation of said rotatable member to shift said shiftable member in the opposite direction by engaging the said shoulder-surface.

FREDERICK P. ROSBACK.

Copies of this patent may be obtained for five cents each, by addressing the "Commissioner of Patents, Washington, D. C."